United States Patent [19]

Alfes et al.

[11] 4,165,431

[45] Aug. 21, 1979

[54] CHLORINATION OF POLYOLEFINS IN THE PRESENCE OF COMPLEX FORMERS

[75] Inventors: Franz Alfes, Krefeld; Diez Heine, Leverkusen; Reinhard Kaiser, Cologne; Günter Kolb, Leverkusen; Joachim Probst, Cologne; Franz Weider, Leverkusen, all of Fed. Rep. of Germany

[73] Assignee: Bayer Aktiengesellschaft, Fed. Rep. of Germany

[21] Appl. No.: 881,675

[22] Filed: Feb. 27, 1978

[30] Foreign Application Priority Data

Mar. 5, 1977 [DE] Fed. Rep. of Germany ....... 2709689

[51] Int. Cl.$^2$ .................... C08F 8/20; C08F 8/22
[52] U.S. Cl. .................................................. 525/357
[58] Field of Search ................................................ 526/44

[56] References Cited

U.S. PATENT DOCUMENTS

| 2,844,635 | 7/1958 | Mayor | 204/163 R |
|---|---|---|---|
| 2,849,431 | 8/1958 | Baxter | 526/44 |
| 3,092,612 | 6/1963 | Makowski | 526/44 |
| 3,192,188 | 6/1965 | Orthner et al. | 526/44 |
| 3,567,610 | 3/1971 | Krol et al. | 204/163 R |
| 3,703,473 | 11/1972 | Lasco | 260/651 R |

FOREIGN PATENT DOCUMENTS

1184501  5/1959  Fed. Rep. of Germany.

*Primary Examiner*—William F. Hamrock
*Attorney, Agent, or Firm*—Connolly and Hutz

[57] ABSTRACT

A chlorinated colorless polyolefin, preferably a chlorinated colorless isotactic polypropylene, soluble in carbon tetrachloride and having a chlorine content of from 60% to 70% by weight and an average degree of polymerization of from 2000 to 6000, produced by chlorinating polyolefins having a degree of polymerization of from 2000 to 20,000 in suspension or solution or in suspension and solution at 40 to 60° C. in the presence of a halogen transfer agent, a chlorination catalyst and from 0.2 to 0.5% by weight, based on polyolefin, of at least one compound corresponding to the general Formula (I):

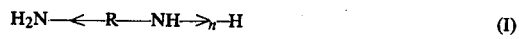

$$H_2N\!-\!\!\!\left(\!-\!R\!-\!NH\!-\!\right)_{\!n}\!-\!H \qquad (I)$$

in which R represents the ethylene, propylene or butylene group and n=1–6.

7 Claims, No Drawings

CHLORINATION OF POLYOLEFINS IN THE PRESENCE OF COMPLEX FORMERS

This invention relates to the chlorination of polyolefins in the presence of oligoalkylene oligoamines in suspension and/or solution up to a preferred chlorine content of from 60 to 70% by weight.

It is known that polyolefins, such as polyethylene, which have been produced with organometallic mixed catalysts, for example from titanium chlorides and organoaluminium compounds, can be chlorinated or sulphochlorinated in the presence of complex formers such as sodium ethylene diamine tetraacetate, oxalic acid, tartaric acid or a mixture of acetic acid and acetic acid anhydride. The chlorination reactions, which are preferably carried out both in suspension and also in solution, are preferably carried out in chlorinated hydrocarbons, such as tetrachloroethane or carbon tetrachloride (cf. DT-AS No. 1,184,501).

It is also known that paraffin wax can be chlorinated up to a chlorine content of approximately 70% by weight in carbon tetrachloride solution in the presence of iron impurities by masking the latter with a ferricyanide or ferrocyanide of metals of Group I or II of the Periodic System (cf. U.S. Pat. No. 3,567,610).

It is also known that low molecular weight araliphatic compounds containing iron or other halogen transfer agents and impurities can be chlorinated in the side chain by adding phosphorus halides together with triphenyl phosphate or only oligoalkylene oligoamines as complex formers to the chlorination solution (cf. U.S. Pat. No. 3,703,473 and U.S. Pat. No. 2,844,635). This prevents substitution in the nucleus. In the second of the two above-mentioned U.S. patents, the following oligoalkylene oligoamines are preferably used: diethylene triamine, triethylene tetraamine and tetraethylene pentamine.

The present invention relates to a process for the chlorination of polyolefins in solution and in suspension, wherein oligoalkylene oligoamines, hereinafter referred to in short as oligoamines, are added for the complexing of iron ions and other halogen transfer agents, for example titanium and antimony ions, which can generally occur in various oxidation stages. These oligoamines correspond to the general formula:

with $n=1-6$, in which R may represent the ethylene, propylene and the butylene group, but preferably the ethylene group. They are generally readily soluble in polar and apolar solvents, particularly carbon tetrachloride. After these easily soluble oligoamines have been added, the solutions or suspensions of the polyolefins remain yellowish in colour during chlorination and a substantially colourless reaction product having chlorine contents preferably from 60 to 70% by weight and, more especially, from 63 to 70% by weight, is obtained. In the absence of these complex-forming additives, the chlorination reaction in the presence of iron ions or similar ions, for example titanium or antimony ions, is slowed down to a considerable extent. Chlorine contents of at best between 50 and 55% by weight are obtained, in addition to which the products are brown to black in colour. Since iron-containing working parts are also present in enamelled vessels and autoclaves, in which chlorinations of polyolefins are generally carried out, carbon tetrachloride solutions for example also always contain traces of iron or iron ions in quantities of up to 100 ppm which inhibit the chlorination reaction. In that case, it is essential to add complex formers. Other already mentioned complex formers generally show little activity in the presence of relatively large quantities of dissolved metal ions because they are either sparingly soluble or give rise to serious degradation of the polyolefin, particularly isotactic polypropylene.

The polyolefins which are used for chlorination are polymers of α-olefins, such as ethylene and propylene, which have been polymerised with the aid of organometallic mixed catalysts, for example titanium chlorides and organoaluminium compounds, or under high pressure. The preferred polyolefin is isotactic polypropylene.

The chlorination reactions are carried out in solvents that are largely inert to chlorine, such as o-dichlorobenzene, tetrachloroethylene, carbon tetrachloride, etc., preferably in carbon tetrachloride. They may be carried out at temperatures of from 40° to 60° C. under pressure (0.5 to 50 bars) and in the absence of pressure, preferably in the absence of pressure. In the case of highly tactic polyolefins, such as those produced with organometallic mixed catalysts, the chlorination reaction is initially carried out in suspension at temperatures below 60° C., subsequently progressing in solution at relatively high chlorine contents, generally between 50 and 60% by weight of chlorine, in the polymer. The polyolefin solids content of the suspension/solution used for chlorination amounts to between 3 and 10% by weight and preferably to between 4 and 6% by weight, whilst the solids content of the chlorinated end solution amounts to between 8 and 27% by weight and preferably to between 10 and 16% by weight.

The chlorination catalysts used are the usual radical-forming substances such as, for example, azoisobutyronitrile or peroxides, such as benzoyl peroxide, 2,4-dichlorobenzoyl peroxide, tert.-butyl perpivalate and dicyclohexyl peroxy dicarbonate, also photo-initiators such as benzoin ethers, for example benzoin isopropyl ether, but only in the presence of natural or UV-light, whereas the peroxides and azobutyronitrile are also active in the absence of light and are preferred. The chlorination catalysts are used in quantities of from 0.02 to 0.4% by weight, based on polyolefins.

The following compounds and mixtures thereof may be used as oligoamines: ethylene diamine, diethylene triamine, triethylene tetraamine, tetraethylene pentamine and pentaethylene hexamine. They are added to the chlorination solution in quantities of from 0.05 to 2% by weight and preferably in quantities of from 0.2 to 0.5% by weight, based on the polyolefin. Smaller quantities of oligoamine should be avoided because, in their case, the retarding, discolouring and degrading effect of the iron is again in evidence. On the other hand, overlarge quantities should also be avoided because, in their case, the oligoamine itself discolours the end product. The quantity in which the oligoamine is used must of course be adapted to the content of metal ions to be complexed which can amount to between about 30 and 150 ppm, based on the solution as a whole. For every ten milligram equivalents of the metal, there is approximately 0.0035 to 0.0075% by weight of the oligoamine used, based on the solution as a whole.

It was surprising to find that the mode of operation of the initiators used is not influenced by the oligoamines and that the oligoamines themselves retain their mode of operation, even with advanced chlorination. The velocity of the chlorination reaction is also substantially unaffected by additions of oligoamines, in other words there is virtually no deceleration of the chlorination reaction in the presence of the oligoamines by comparison with metal-ion-free tests carried out without these additives. The addition of these complex formers also has virtually no effect upon the viscosities or rather the intrinsic viscosities of the chlorination products.

The advance of the process according to the invention lies in the fact that polyolefins, particularly isotactic polypropylene, can be chlorinated at low temperatures of from 40° to 60° C. in inert solvents, such as carbon tetrachloride, in the presence of readily soluble oligoamines as complex formers for inhibiting metal ions without serious degradation of the chain to form colourless products having chlorine contents of up to 70% by weight. Low temperatures are preferred insofar as they limit the serious degradation which the chain undergoes at elevated temperatures. In the chlorination of isotactic polypropylene, only slightly degraded end products with relatively high viscosities which, for sufficiently high chlorine contents, between 60 and 70% by weight, show outstanding solubility in most organic solvents and excellent chalking stability at room temperature is obtained in this way. In the context of the invention, chalking stability is understood to be the effect whereby films of the chlorinated polyolefin did not cloud on contact with water.

The chlorination reactions described in the following Examples were mostly carried out in the absence of pressure. However, they may also be carried out under pressure (0.5 to 50 bars) in autoclaves.

The chlorinated polyolefins are used in particular as lacquer binders.

The percentages quoted in the Examples are based on weight unless otherwise indicated.

EXAMPLE 1

300 g of 98.5% isotactic polypropylene ($[\eta]=3.14$ dl/g in decalin at 135° C.) having an average degree of polymerisation $P\eta$ of 8000 are suspended in powder form in 3.6 liters of carbon tetrachloride in a stirrer-equipped apparatus, followed by the addition of 3 g of iron filings and 900 mg of tetraethylene pentamine. The chlorination reaction is carried out in the absence of light at 50° C. in the presence of 650 mg of dicyclohexyl peroxy dicarbonate which is added in portions. With a 60 g/h stream of chlorine, a readily soluble chlorination product is obtained after about 30 hours, being precipitated in methanol and dried in vacuo at 50° C. A colourless powder with a chlorine content of 65.3% by weight is obtained. It has an intrinsic viscosity $[\eta]$ in tetrahydrofuran of 0.64 dl/g and an average degree of polymerisation $P\eta$ of approximately 2500.

Comparison Example A

The procedure is as in Example 1, except that the complex former, tetraethylene pentamine, is not added. After a chlorination time of 44 hours with a chlorine input of 57 g/h, an only partly dissolved, heavily discoloured product having a chlorine content of 49.5% by weight is obtained. The dissolved fraction has an average degree of polymerisation $P\eta$ of less than 1000.

Comparison Example B 3 g of the polypropylene mentioned in Example 1 are suspended together with 300 mg of iron filings and 1 g of ethylene diamine tetraacetic acid in 3.6 liters of carbon tetrachloride. Azoisobutyronitrile (300 mg) is used as catalyst. After chlorination for 35 hours at 50° C. in the presence of light with a chlorine input of 50 g/h, an only partly dissolved, inpure product having a chlorine content of 49.2% by weight and an average degree of polymerisation $P\eta$ of less than 1000 is obtained.

EXAMPLE 2

300 g of the polypropylene mentioned in Example 1 are suspended together with 3 g of iron filings and 600 mg of pentaethylene hexamine in 3.6 liters of carbon tetrachloride. Chlorination is carried out over a period of 35 hours at 50° C. in the presence of light with 375 mg of azoisobutyranitrile and a chlorine input of 65 g/h. End product is a colourless product having a chlorine content of 65.5% by weight and an intrinsic viscosity of 0.77 dl/g in tetrahydrofuran, which corresponds to an average degree of polymerisation $P\eta$ of approximately 3200.

EXAMPLE 3

The substances and quantities are as in Example 2, except that instead of the hexamine 600 mg of triethylene tetraamine are added. The chlorination reaction is carried out at 50° C. in the presence of 225 mg of azoisobutyronitrile and light with a chlorine input of 70 g/h. The end product is a colourless powder having a chlorine content of 63.7% by weight and an intrinsic viscosity of 0.90 dl/g in tetrahydrofuran, which corresponds to an average degree of polymerisation $P\eta$ of around 4900.

EXAMPLE 4

100 g of the polypropylene mentioned in Example 1 are suspended in 1200 ml of dry carbon tetrachloride in a 2 liter flask. 0.06 g of benzoin isopropyl ether, 290 mg of anhydrous iron(III)chloride and 1120 mg of 1,11-diamino-3,6,9-triazaundecane (tetraethylene pentamine) are added to the resulting solution. A fluorescent tube which gives super-actinic light is mounted in front of and behind the flask level with its upper edge. The contents of the flask are heated to 50°–55° C., the lamps are switched on and chlorine is introduced at a rate of 100 g/h. After an introduction time of 5 hours, the polypropylene has passed completely into solution. A chlorination product is precipitated with methanol and dried in vacuo at 50° C. until constant in weight. A colourless powder having a chlorine content of 63.5% and an average degree of polymerisation $P\eta$ of approximately 1500 is obtained.

Practical Example

Testing of chalking resistance:

The lacquer solution of 70 parts by weight of chlorinated polypropylene, prepared for example in accordance with Example 1, and 30 parts by weight of plasticiser (chloroparaffin 40/diphenoxyethyl formal 3:1) in 150 parts by weight of xylene is coated onto a degreased glass plate. The dry film has a layer thickness of approximately 40 μm. This test plate is stored in water having a temperature of 28° C. A parallel test is carried out under the same conditions with a lacquer of 70 parts by weight of chlorine rubber (chlorinated polyisoprene, chlorine content approximately 64.5% by weight, viscosity 90 cP in 20% toluene solution, measured at 20° C. in a Hoppler viscosimeter) and 30 parts by weight of the above plasticiser mixture.

After storage for only 48 hours in water having a temperature of 28° C., the chlorine rubber has undergone heavy chalking in the form of milky-white clouding, whilst the lacquer based on chlorinated polypropylene is still unchanged. On a marking scale of 1 to 6 (1=unchanged; 6=white, opaque), the chlorine rubber lacquer is awarded a mark of 4 to 5, whilst a lacquer containing chlorinated polypropylene is awarded a mark of 1.

We claim:

1. A process for chlorinating a polyolefin which comprises chlorinating the polyolefin with chlorine in solution or suspension or first in one and then in the other in the presence of (1) an iron, titanium or antimony chlorine transfer agent, (2) a chlorination catalyst and (3) from 0.2 to 0.5% by weight, based on the polyolefin, of at least one compound of the formula $H_2N\text{---}(R\text{---}NH)_nH$ wherein R is ethylene, propylene or butylene and n is from 1 to 6, at a temperature of from 40° to 60° C. up to a chlorine content of from 60 to 70% by weight.

2. The process of claim 1 wherein the polyolefin is isotactic polypropylene.

3. The process of claim 2 wherein the isotactic polypropylene is chlorinated to a chlorine content of at least 50% by weight in a suspension in carbon tetrachloride and is subsequently chlorinated in solution to a chlorine content of from 60 to 70% by weight.

4. The process of claim 1 wherein chlorination is carried out with a polyolefin solids content in suspension or solution of between 3 and 10% by weight.

5. The process of claim 4 wherein the solids content is between 4 and 6% by weight.

6. The process of claim 1 wherein the solids content of the chlorinated end solution or suspension is between 8 and 27% by weight.

7. The process of claim 6 wherein the solids content is between 10 and 16% by weight.

* * * * *